July 5, 1938. C. F. LAUTZ ET AL 2,122,652
LINK
Filed Nov. 16, 1935
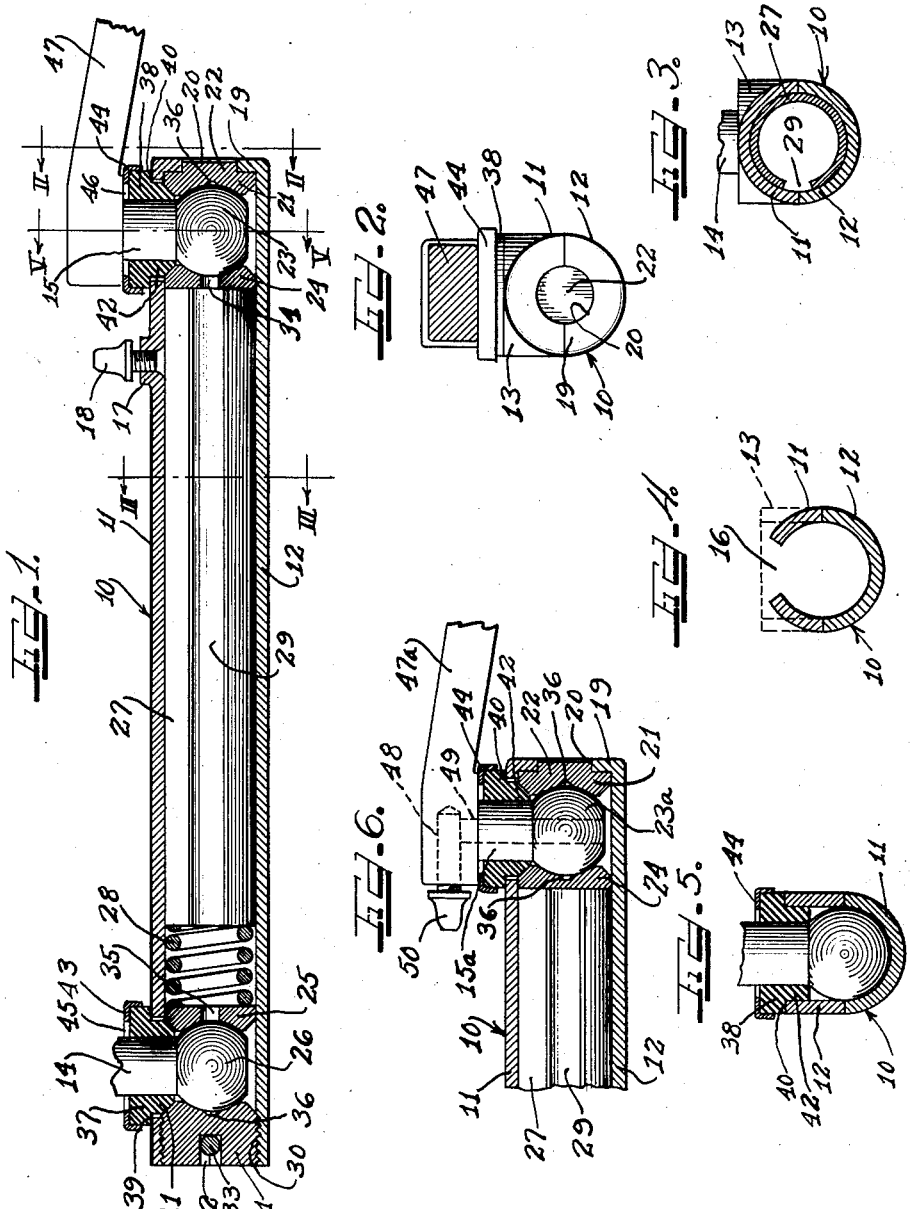

Patented July 5, 1938

2,122,652

UNITED STATES PATENT OFFICE 2,122,652

LINK

Carl F. Lautz and Ralph F. Peo, Buffalo, N. Y., assignors to Houde Engineering Corporation, Buffalo, N. Y., a corporation of New York Application November 16, 1935, Serial No. 50,085

7 Claims. (Cl. 74—579)

This invention relates to links adapted to be used as connecting units for shock absorbers and the like.

More specifically this invention relates to connecting links having oscillatory joints at both ends thereof together with means for sealing the joints and simplified means for automatically taking up the wear of the joints.

The housing for the links of this invention may be formed from tubular metal stock and preferably formed in semi-cylindrical sections which can be readily welded together along their mating surfaces to provide a substantially tubular housing. The housing metal is extruded near the ends thereof to provide upstanding peripheral flanges which define circular or oval openings in the side walls of the housing. The studs of the joints extend freely through these openings and have ball ends seated in concave disk members which are freely rotatable in the housing. A spacer member is slidably mounted across the intermediate part of the housing and is urged at one end against an inner disk member. The other end of the spacer member abuts a coiled spring which is held under compression between the other inner disk member and the end of the spacer member.

The joints thus formed near the ends of the housing are efficiently sealed by resilient washers or grommets preferably formed of an oil-resistant rubber-like material such as "Duprene". Since the openings formed in the sides of the housing are bounded by peripheral edges lying in a flat plane, the rubber grommets or washers fit tightly against these edges and seal the joints from the atmosphere and against loss of lubricant. Movement of the stud relative to the housing is readily permitted by interparticle flow of the grommets.

It is therefore an object of this invention to prepare a connecting link having oscillatory joints formed near the ends thereof and effectively sealed against ingress of dirt and loss of lubricant.

A further object of this invention is to provide a connecting link having oscillatory joints formed in the end portions thereof with a single means for automatically taking up wear of the bearing surfaces of said joints.

Another object of this invention is to provide a link structure having a tubular housing provided with side openings near the ends thereof defined by peripheral edges lying in a flat plane.

Another object of this invention is to provide a link having a plurality of disk seating elements for ball ended studs which are uniformly adjusted into proper seating relation against the ball ends of the studs by a single means.

A specific object of this invention is to provide a connecting link having a tubular housing with side openings formed near the ends thereof for receiving ball-ended studs and also having a plurality of disk seating elements in bearing relation with the ball ends of the studs together with a single spring means for automatically taking up the wear of the bearing surfaces to prevent a loosening and rattling of the joints.

A further specific object of this invention is to provide a link having a tubular housing with oscillatory joints formed near both ends thereof and a spacer bar in the intermediate portion of the housing for transmitting adjusting movements applied to one of said joints to the other of said joints.

Other and further objects of this invention will be apparent from the following detailed description of the annexed sheet of drawings which forms a part of this specification.

On the drawing:

Figure 1 is a vertical cross-sectional view, with parts in elevation, of a link according to this invention.

Figure 2 is an end elevational view, with a part in cross section, taken substantially along the line II—II of Figure 1.

Figure 3 is a vertical cross-sectional view taken substantially along the line III—III of Figure 1 with certain parts thereof omitted and broken away.

Figure 4 is a vertical cross-sectional view taken transversely across the housing of the link according to this invention and showing the manner in which the tubular housing is extruded to provide an upstanding peripheral flange defining an opening in the side wall of the housing with the edges of the opening lying in a flat plane.

Figure 5 is a vertical cross-sectional view, with parts in elevation, taken substantially along the line V—V of Figure 1, and Figure 6 is a fragmentary vertical cross-sectional view of the modified form of link according to this invention having a lubricating channel formed through the stud element.

As shown on the drawing:

In Figures 1 to 6 inclusive the reference numeral 10 indicates generally the tubular metal housing for the links of this invention. The housing 10 is formed from two complementary semi-cylindrical half-sections 11 and 12 respectively which are welded together along their mating surfaces after the extruding operation to form the upturned flanges such as 13 shown in Figures 2, 3 and 4. The link shown in Figure 1 has the studs 14—15 thereof projecting from the same side of the link and therefore the semi-cylindrical section 11 is provided with an opening 16 (Figure 4) near each end thereof. The metal surrounding the openings 16 is then extruded outwardly to form the flange 13 forming an enlarged opening through which the studs 14 and 15 project. The flanges 13 provide a flat peripheral edge around the openings for a purpose to be hereinafter described.

After the formation of the flanges 13 the semi-cylindrical tubular portion 11 may be welded to the bottom portion 12 as shown in Figures 3 and 4. It is obvious, of course, that one of the openings 16 and one of the flanges 13 can be formed in the other semi-cylindrical member 12, in case it is desired to provide a link having the studs projecting from opposite sides thereof.

During the extruding operation to form the flanges 13, the member 11 can also be punctured and extruded as shown at 17 (Figure 1) to provide an outturned boss for receiving a lubricant fitting 18.

As shown in Figures 1, 2 and 6, the housing 10 has an inturned flange 19 formed on one end thereof for defining a restricted opening 20 in the end of the link.

A circular disk seating member 21 abuts the flange 19 and has a laterally extending collar or shank 22 seated in the opening 20 defined by the flange 19.

The face of the seating member 21 is concave as shown for receiving a portion of the ball end 23 of the stud 15 in bearing relation.

A pair of inner circular disk seating members 24 and 25 are provided in the housing 10. The disk 24 receives a portion of the ball end 23 of the stud 15 while the disk 25 receives a portion of the ball end 26 of the stud 14 in bearing engagement therewith.

A split cylindrical spacer member 27 is slidably mounted in the intermediate portion of the housing 10 and abuts the disk member 24 at one end thereof and a coiled spring 28 at the other end thereof. The coiled spring, in turn, abuts the back of the disk member 25.

As shown in Figures 1 and 3, the spacer member 27 is slit as at 29 and can be cheaply formed from flat stock by merely rolling the stock around a mandrel. The member 27, at the same time, is partly compressed within the housing 10 so that it will not rattle therein.

The other end of the housing 10 is threaded as at 30 for receiving a plug 31 having a concave face which acts as a seating member for a portion of the ball end 26 of the stud 14. The plug 31 is grooved as at 32 and a cotter pin 33 may be provided to lock the stud in adjusted position.

Lubricant from the nipple 18 can readily travel along the spacer member 27 to lubricate the spring 28. Furthermore, the inner disk members 24 and 25 may be provided with openings 34 and 35 through the central portion thereof for transmitting the lubricant to the bearing surfaces of the disk and ball members.

If desired, the concave faces of the disk members may be grooved as shown at 36 for distributing the lubricant along the bearing surfaces.

The side openings in the housing 10 through which the studs 14 and 15 project are sealed by resilient grommets or washers 37 and 38 which snugly fit around the shanks of the studs as shown. These grommets or washers are preferably formed of a resilient artificial rubber material such as "Duprene" which is not softened by oil or lubricants.

The grommets 37 and 38 have a shoulder portion, 39 and 40 respectively, which are seated on top of the flat peripheral edges formed by the upturned flanges 13 and also have reduced neck portions 41 and 42 extending down into the side openings to abut the disk members of the oscillatory joints in the housing.

As shown in Figure 5, the bottom of the reduced neck portion 42 is flat. However, as shown in Figures 1 and 6, this bottom of the reduced neck portion 42 is distorted or compressed against the disk members and assumes the contour of these members through interparticle flow of the rubber material.

Metal caps 43 and 44 fit over the grommets 37 and 38 respectively. These caps 43 and 44 are provided with enlarged central openings 45 and 46 respectively through which the shanks of the stud members 14 and 15 can freely project.

Connecting arms such as 47 are secured to the shanks of the stud members 14 and 15 as shown at 15 and hold the rubber grommets 37 and 38 under slight compression to maintain a tight fit of the grommets against the flat peripheral edges defining the side openings in the housing 10. In this manner the oscillatory joints formed on both ends of the link are effectively sealed against ingress of dirt and egress of lubricant.

Since the peripheral edges of the side openings in the housing lie in a flat plane a full contacting of the shoulders 39 and 40 of the grommets therewith is insured.

As shown in Figure 6, each oscillatory joint in the link may be separately lubricated by providing communicating passageways 48 and 49 in the connecting arm 47a and stem member 15a. The passageway 48 of the connecting arm 47a has a lubricating nipple 50 threaded therein while the passageway 49 of the stud member 15a opens at the bottom of the ball end 23a of the stud. Lubricant supplied through the nipple flows through the passageways 48 and 49 and is distributed along the bearing surfaces of the joint. The lubricating grooves 36 of the disk members 21 and 24 can effectively distribute the lubricant over all of the bearing surfaces in the joint. Obviously the passageway 49 could be extended to the top of the arm 47a and could receive the nipple 50 directly thereon. However, intersecting passageways 48 and 49 are shown as the preferred modification because sufficient space is not available in actual use on top of the arm 47a for the nipple 50.

From the above description it should be understood that the joints of this invention utilize a single spring member such as 28 to take up any wear of the bearing surfaces of the two separate oscillatory joints. The plug member 31 is threaded into the housing 10 a sufficient distance to compress the spring 28 and thereby maintain the disk members of the joint in snug engagement with the ball ends of the studs. As the bearing surfaces wear away during use of the joint the spring member 28 expands to automatically take up this wear and the expansion of the spring is effective against both of the inner disk members since it is transmitted through the spacer member 27 to the disk member 24 and also since it acts directly against the disk member 25.

The provision of the upstanding extruded flanges 13 around the side openings in the housing insures a tight fitting seal for the joint and makes possible the use of a simple rubber grommet as the sealing means.

In operation, the joints at the ends of the housing permit a free movement of the studs therein in all directions relative to the housing. This movement is readily permitted by the interparticle flow of the rubber grommets which merely impart a desired resistance to the movements of the stud.

The links of this invention can be formed from low priced parts which can be assembled without difficulty.

We are aware that many changes may be made and numerous details of construction may be varied through a wide range without departing from the principles of this invention, and we, therefore, do not purpose limiting the patent granted hereon otherwise than necessitated by the prior art.

We claim as our invention:

1. A link comprising an elongated tubular member having openings formed in the side walls thereof, extruded upturned flanges defining said openings to provide tops for the openings lying in a flat plane, inner and outer seating members adjacent said openings at the ends of said housing, said inner seating members being slidable in the housing, ball-ended studs in bearing engagement with the faces of said seating members, a rigid spacer member slidable in the intermediate portion of said housing and a single coiled spring held under compression between said spacer member and one of said inner disk members for urging said inner seating members tightly against said stud members for automatically taking up wear of the cooperating bearing surfaces thereof, and rubber grommets fitted over the flat peripheral edges of the openings and extending into the housing to effectively seal the housing against ingress of dirt and egress of lubrication.

2. A link comprising a tubular metal housing having an inturned flange at one end thereof and a pair of spaced openings in the side walls thereof adapted to receive studs therethrough, an outer disk member abutting said flange at the end of the housing having a concave face in alignment with one of said side openings in the housing, a stud member having a ball end seated in said concave face, a second seating member on the opposite side of said ball end having a concave face for receiving said ball end, a plug member threaded in the other end of said housing and having a concave face for receiving the ball end of another stud member, a second seating member slidable in the housing and having a concave face for receiving the opposite side of said ball end, a spacer bar in the intermediate portion of the housing abutting one of said seating members, a coiled spring held under compression between the other end of said spacer bar and the other slidable seating member whereby said seating members are held in full bearing engagement with the ball ends of the studs, and resilient rubber grommets disposed around said studs and seated snugly around the peripheries of the side openings in the housing to seal the housing.

3. A link comprising a tubular metal housing having an inturned flange at one end thereof and a plug threaded in the other end thereof, a disk seating member abutting said inturned flange and having a concave face, said plug member at the other end of said housing also having a concave face, a pair of inner disk members having concave faces in spaced relation from the faces of said plug and said outer disk member, studs having ball ends seated in said concave faces, means in the intermediate portion of said housing urged against said inner disk members for taking up wear of the bearing surfaces of the disks and ball ends of the studs, and means for lubricating said bearing surfaces.

4. A link comprising a tubular metal housing having a pair of oscillatory stud joints formed near the ends thereof, said joints including inner disk seating members slidable in the housing, a spacer member slidable in the intermediate portion of said housing and a single coiled spring held under compression between said spacer member and one of said inner disk members whereby said disk members are urged in bearing engagement against the studs of the joints, openings extending through the inner disk members, and means for supplying lubricant to the intermediate portion of said housing for travel through said openings to lubricate the joints.

5. In a link a tubular housing having oscillatory joints at the ends thereof including stud seating members slidable in the housing, an elongated split tubular spacer slidably mounted in the intermediate portion of the housing under slight radial compression and a relatively short coiled spring under compression between one end of the spacer and a seating member whereby the joint elements are maintained in proper bearing relation.

6. In a joint a tubular housing having an oscillatory joint formed at least at one end thereof, said joint being composed of a plurality of joint elements, an elongated longitudinally split spacer slidable in the housing under radial compression to prevent rattling and means to slide said member against one of the joint elements to maintain proper bearing relation between the parts of the joint.

7. A link comprising a cylindrical tube having an opening in the side thereof, said tube having an outturned tubular portion extending normal to the axis of the tube around the opening, a rim defined by the edge of the tubular portion, said rim lying in a flat plane parallel with the longitudinal axis of the tube, means in said tube defining bearing surfaces adjacent said opening, a stud having a shank portion projecting freely through said opening and a head portion in said tube in bearing engagement with said bearing surfaces, a resilient grommet fitted snugly around the shank of said stud and mounted on said rim, said grommet also having a portion thereof snugly disposed around said shank of the stud and extending into the tube whereby said tube is effectively sealed and movement of the stud relative to the tube can occur through interparticle flow of the grommet material without breaking the seal.

CARL F. LAUTZ.
RALPH F. PEO.